July 14, 1970    J. L. MORE    3,520,413

SEPARATING BAFFLE

Filed July 29, 1968

INVENTOR
John L. MORE

ATTORNEY

United States Patent Office 3,520,413
Patented July 14, 1970

3,520,413
SEPARATING BAFFLE
John L. More, Montreal, Quebec, Canada, assignor to Separator Engineering Ltd., Montreal, Quebec, Canada
Continuation-in-part of application Ser. No. 606,830, Jan. 3, 1967. This application July 29, 1968, Ser. No. 748,563
Claims priority, application Canada, Feb. 23, 1966, 953,089
Int. Cl. B01d 35/20
U.S. Cl. 210—77     23 Claims

ABSTRACT OF THE DISCLOSURE

A baffle for use in separating one substance from a mixture of at least two substances. The baffle is particularly useful in separating pulp solids from water and comprises an open or closed flexible trough-like member partially filled with a nongaseous flowable material. The baffle can be positioned on an edge of a vibrating screen allowing the water to drain through the screen while the pulp solids pass under the baffle and off the edge of the screen.

---

This application is a continuation-in-part of application Ser. No. 606,830, filed Jan. 3, 1967, now abandoned.

The present invention relates to a baffle structure for preventing the flow of a first material past it while permitting passage of a second material, which is capable of exerting a greater force on the baffle than the first material, from a mixture of the two materials.

The materials could be two immiscible liquids or liquid-like substances having different densities with the denser material passed by the baffle while the less denser material is retained. The materials could also be a mixture of dense and light solid particles with the denser particles passed by the baffle. The materials could also be a mixture of liquid and solids with means for imparting motion to the solids to give them energy to pass the baffle while the liquid is retained.

The device which forms the subject of the present invention is particularly suitable for use in the clarification of pulp mill effluent or other industrial effluent and the following discussion is presented in relation to the particular field of clarifying pulp mill effluent.

In the clarifying of pulp mill effluent, it is conventional to feed the effluent (water with the solid material dispersed therein) onto the upper surface of a vibrating, horizontal screen. The motion of the screen propels the solid material towards the periphery of the screen while water passes through the screen. Depending on the type of arrangement employed, the solid material may be propelled to the outer periphery of a circular screen, to the inner periphery of a ring-shaped screen or to one end of a rectangular screen while water passes through the screen. The solid material, devoid of some of the original water, is eventually discharged from the screen over its periphery and into suitable means provided for conveying the solid material to a further clarifying stage or to another stage of the paper manufacturing process.

A problem encountered with screening devices of this character is that there is a tendency for some of the excess water to flow over the periphery of the screen with the solid material. This problem is particularly acute if the screen has become partially clogged by solid material with the result that its water flow capacity has been substantially reduced. To overcome this difficulty, it has been the practice to install a flexible curtain, for example of rubber or similar material, above the screen with its lower edge resting on the upper surface of the screen adjacent to the periphery over which the solid material is to be discharged. The solid material being propelled across the screen by the forces imparted thereto by the vibrating screen builds up as solid agglomerations of material in contact with the lower edge of the curtain and eventually the forces involved are sufficient to flex the curtain and permit the solids to pass therebeneath. Ideally, only a short length of the curtain lifts from the screen as each mass of solid material passes beneath the curtain, the remainder of the curtain remaining in contact with the screen to act as a water barrier or baffle.

This curtain, however, does not provide a satisfactory solution to the problem of preventing water being discharged over the screen periphery along with the solid material. Firstly, the screen is in constant motion to propel the solids across its upper surface. Such motion generally has a vertical component and a horizontal gyratory component and this motion of the screen constantly varies the relationship between the lower edge of the curtain and the screen. If a gap exists between the screen and curtain when the screen's upper surface is at the lowest point of its vertical travel, then water tends to flow too freely under the curtain so that the solid material, even after clarification, is too wet. If the curtain is lowered to eliminate this gap, great care must be taken to insure that the level of its bottom edge is not such that when the screen is at the highest point of its vertical travel, the curtain exerts an excessive force on the screen surface which could damage it. Furthermore, under these latter conditions, the forces imparted to the solid material may be insufficient to overcome the additional rigidity which the curtain acquires, this resulting in an excessive build-up of material against the lower edge of the curtain. When this solid material eventually passes beneath the curtain, there is a considerable, simultaneous rush of water.

Furthermore, contact between the abrasive, vibrating screen and the lower edge of the curtain abrades the lower edge of the curtain in an uneven fashion so that, even when static conditions prevail, gaps exist between these components at certain locations around the curtain. The effect of these gaps is extremely pronounced when the apparatus is in use and considerable water flow can occur. The life of the curtain is consequently fairly short, and improper adjustment thereof so that it is urged into forceful contact with the screen shortens its useful life even further.

A practical difficulty arises from the fact that the position of the curtain, for optimum results, must be finely adjusted with respect to the screen as explained above. Under factory conditions this is a difficult task and, even after the adjustment has been made the screen and curtain tend to "wander" with respect to one another thereby adversely affecting the adjustment. In situ attempts to remedy this situation can, in fact, aggravate the problem for the efforts to correct the screen-curtain relationship at one peripheral location can create improper conditions at other locations, i.e., too great a gap or too great a pressure between the curtain and the screen.

The present invention in one embodiment seeks to provide a baffle or liquid barrier device which can replace the curtain described above.

In accordance with the invention, there is provided a separating baffle adapted to be positioned in the flow path of a mixture of liquids or solids of different densities or mixtures of solid and liquid material. The baffle comprises at least one flexible-walled trough-like member partially filled with a flowable material. The baffle can be positioned to act on a vertical or horizontal flow path. The structure containing the mixture to be separated can, along with the baffle if desired, be vibrated to impart energy to the material passing the baffle.

The term "solid material" as used throughout this application includes agglomerations of fibrous, particulate or granular materials.

In one embodiment particularly adapted to treat pulp mill effluent, the baffle rests on the upper surface of a vibrating screen. The baffle can be located adjacent the edge of the screen over which the solids are to be discharged. The liquid-solid mixture is deposited on the screen at a location away from the edge and caused to flow toward the edge of the screen with the liquid passing through the screen. The baffle device on the screen is in every respect superior to the suspended curtain used heretofore. The baffle substantially eliminates flow of free liquid over the periphery of the screen, does not require delicate adjustment with respect to the screen and has long life.

In a preferred embodiment, the baffle can comprise a flexible closed annular member at least partially filled with a substance capable of flowing and positioned on the surface of a circular screen adjacent its edge.

Having generally explained the invention, reference will now be made to the drawings in which.

Figure 1:
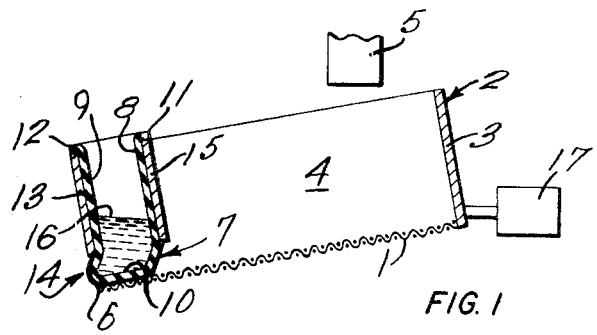
FIG. 1 is a vertical cross section of the baffle device positioned on a screening member.

As shown in FIG. 1, the material separating device comprises a screening member 1 fixed to a frame 2 which frame, in a well-known manner, is subjected to vibratory motion in both vertical and horizontal directions by an unbalanced drive means 17. The frame of the separating device includes a back wall 3 and side walls 4 attached to the screening member to direct the solid-fluid mixture deposited on the screen through an inlet 5 to the front edge 6 of the screen. To aid in directing the solid-fluid mixture toward the edge 6, the screen can be arranged to slope downwardly as shown. The solid-fluid mixture, in flowing toward the edge 6, is drained of fluid by screen 1 with the larger particles of solid material, incapable of passing through the screen, moving toward the edge 6. A baffle 7 is positioned adjacent the edge 6 in the flow path of the solid-fluid mixture. The baffle comprises a trough-like member constructed of flexible material such as pure gum rubber or suitable synthetic plastic. The material is selected to resist the deleterious effects from the type of fluid-solid mixture treated while having sufficient flexibility to pass solid material in a manner to be described. The baffle comprises side walls 8 and 9 and a bottom wall 10. The baffle is connected at its ends to the side walls 4 and freely suspended from its top edges 11 and 12 so that its bottom wall 10 rests on the surface of the screen adjacent edge 6. The ends of the baffle may be adhesively connected to the side walls 4 to provide a liquid seal so the baffle acts as a dam. Alternatively, the ends of the baffle may be closed and mounted against the side walls 4 in a substantially liquid sealing arrangement. Additional support for the baffle can be provided by a partial front wall 13 of the separating device against which one wall 9 of the baffle rests. This front wall 13 terminates short of the surface of the screen to provide an opening 14 through which the solid materials can pass. An additional supporting wall 15 connected to the side walls 4 of the separating device can also be used to help maintain the baffle in position. The trough-like baffle is partially filled to a uniform depth throughout its length with a nongaseous flowable material 16. This flowable material preferably is water although other liquids or flowable solid particles can be used.

In operation, a solid-fluid mixture such as pulp mill effluent entering the separating device through inlet 5 impinges on the screen and is propelled downwardly toward the edge 6 across the upper surface of the screen with free water flowing through the screen carrying with it solids too fine to be retained by the screen. The solid material, such as wood chips or fibrous, particulate, or granular substances, which is too coarse to pass through the screen is shaken across the upper surface of the screen and eventually encounters the baffle 7. The solids build up against the lower edge of the baffle forming agglomerations which can be considered to act as solid pieces of material. The solid agglomerations have energy imparted to them by the horizontal component of the vibratory force tending to urge them beneath the baffle, lifting a very short section of the baffle slightly at this location. This upward movement of the bottom wall of the baffle, causes a redistribution of the liquid within the baffle, liquid flowing away from the raised portion of the baffle thereby reducing the vertical pressure exerted by the baffle on the solid material tending to move underneath it. Since the vertical force has been reduced, the horizontal force due to the vibratory motion and the sloping direction of the screen causes the solid material to pass beneath the baffle on the surface of the screen and drop off the edge 6.

It has been found in experimental work that an agglomeration of solid material or a single wood chip of considerable size passing beneath the baffle only raises a very short portion of it from the screen. The baffle, being flexible, takes on a contour closely approximating that of material passing therebeneath and does not, therefore, leave gaps between the baffle and the screen which could result in loss of water flowing past the baffle.

The baffle device shown is a straight trough. The trough can, however, be curved or even annular in shape. While the trough-like member has been described with an open top, it can also be closed to present a tubular cross section.

While the separating mechanism uses a screen at the bottom, this is not essential. In some applications, the screen can be replaced with a solid bottom. An outlet for the liquid is spaced above the bottom in the side wall. Vibration of the separating device and gravity causes the solids to pass to the bottom adjacent the baffle, and they eventually pass the baffle emerging through opening 14 while the liquid passes through the side wall outlet.

Figure 2:
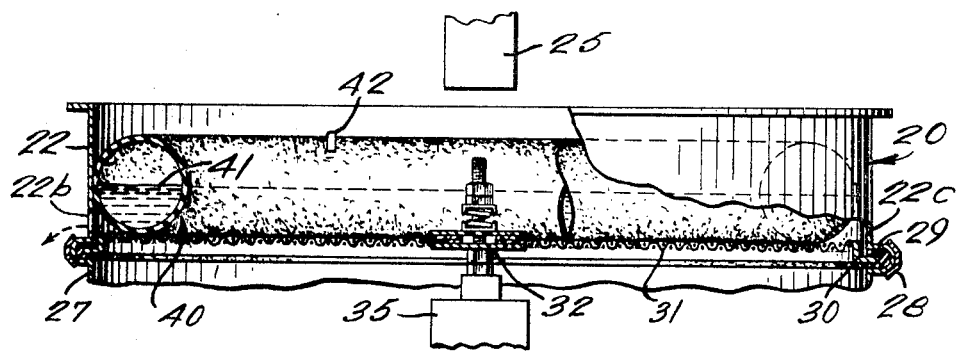
FIG. 2 is a side elevation in partial cross section of part of a screening mechanism with an annular baffle.

In a further embodiment shown in FIG. 2, an annular baffle is used in connection with a circular screen. The baffle in this embodiment comprises a closed trough-like member. The screening mechanism has a casing generally indicated at 20 which includes a ring-like peripheral wall part 22. The lower edge of the wall part 22 is cut away to form a discharge port for the solids. This port is generally indicated at 22b and extends throughout almost the entire 360° circumference of the wall part 22. Narrow legs, one of which is indicated at 22c, are provided, the number of legs being consistent with the requirement that weight of the constructional components above the legs be adequately supported without unduly interrupting flow of solids discharged from the screen.

The wall part 22 is secured, at its lower peripheral edge to a further casing part 27. A clamping ring 28 is provided to secure the casing parts 22 and 27 together, there being a gasket 29 interposed between cooperating flanges of the casing part 27 and the wall part 22. The gasket 29 has an internal peripheral groove which serves to receive the radially outwardly directed flange of an annular screen carrying member 30. The screen, referenced 31, is secured to the vertical, cylindrical part of the member 30 in a conventional manner. Centrally of the screen 31 there is provided a conventional form of screen tensioning device 32. A inlet 25 for the solid-liquid mixture such as a pulp mill effluent to be clarified is located above the level of the screen 31.

Further description of the device illustrated in FIG. 2 is not thought to be necessary in the present application as it is a form now in widespread use in the art. Reference can be made, by way of example, to Canadian Pats. Nos. 415,557, 544,412, 561,577 and 569,397, for further details of the construction and operating characteristics of screening devices of the general type illustrated.

In use of the device illustrated an effluent consisting of water with solid material dispersed therein enters the screening mechanism throuhg the duct 25 and cascades onto the screen 31. The screen 31 is given a vertical oscillatory motion and simultaneously a gyratory motion in a horizontal plane applied by motion applying means 35 which can be connected to the screen tensioning means. The effect of this motion is to propel solid material outwardly towards the outer peripheral edge of the screen 31, the solid material eventually being discharged from the edge of the screen 31 and through the discharge port 22b.

A baffle or barrier device generally indicated at 40 is disposed within the casing part 22 adjacent the outer periphery of the screen 31 and rests on the upper surface of the screen 31. It will be understood that the weight of the baffle 40 is supported by the screen 31. The baffle 40 is in the form of a flexible toroid which is partially filled to the level 41 with a non-gaseous material capable of flowing.

As will be seen from FIG. 2, the overall diameter of the baffle 40 is substantially the same as the inner diameter of the wall part 22 so that a narrow peripheral zone of the baffle contacts the inner surface of the wall part 22. It will be noted that the zone of contact between the baffle 40 and the casing part 22 is above the level of the peripherally extending port 22b. Thus the wall part 22 can be considered to be a retaining wall to prevent outward motion or distortion of the baffle 22 under the influence of the horizontal forces imparted thereto.

The operation of the baffle is similar to that described with reference to the embodiment shown in FIG. 1.

In some installations it is not possible to retain the annular baffle 40 against distortion by means of a retaining wall such as that constituted by the wall part 22. In such installations, for example, where the screen may be ring-like in form and the solid material is propelled across the upper surface of the screen and over the inner peripheral edge of the screen, the baffle shown in FIG. 3 can be employed. This baffle is substantially the same as that illustrated in FIG. 2 but includes retaining means for anchoring the baffle to prevent undue distortion thereof under the action of the forces imposed thereon.

The retaining means consists of a series of wires or rods 43, four wires or rods at 90° intervals are suitable, which extend from anchoring means 44 on the baffle 40 to a ring 45 mounted on the spindle 46 of the tensioning device 32. As will be seen from FIG. 3 the anchoring means 44 are located on the inner periphery of the baffle 40. It has been found in practice that, under many operating conditions, the baffle rotates with respect to the screen 31 and to perimt such motion to occur without restraint the ring 45 is rotatably mounted on the spindle 46 or on any other suitable centrally located component.

While it is preferred to anchor the wires 43 to the baffle 40 at 44, it is possible to anchor these wires or rods to the uppermost part of the baffle 40 as indicated at 47. However, while this type of anchoring is suitable in some instances, it does give the baffle somewhat more freedom of movement than the other form of retaining described and can, in some circumstances, give rise to unsatisfactory operation.

Figure 3:
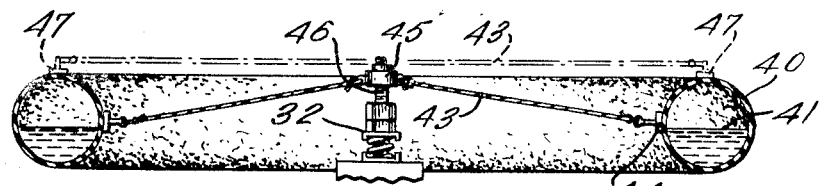
FIG. 3 is a vertical cross section showing a further embodiment of the baffle device in annular form.

The annular baffles shown in FIG. 2 or 3 or the straight baffle device shown in FIG. 1 with a closed construction can be partially inflated to a pressure which is sufficient to render the baffle self-supporting without, however, imparting undue stiffness thereto. A suitable pressure can very readily be obtained by applying air under pressure into the baffle through a conventional air valve 42 as shown in FIG. 2.

Figure 4:
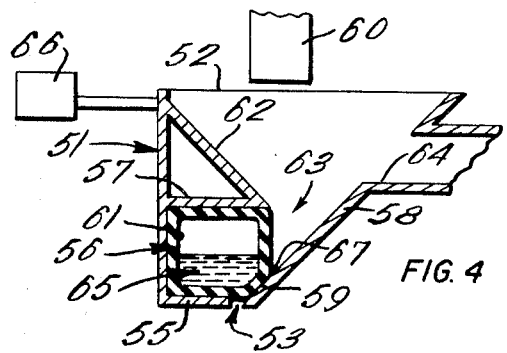
FIG. 4 is a vertical cross section of a further separating apparatus using the baffle device.

A further embodiment of the invention using the novel baffle device positioned in vertical flow path and useful in separating solids from liquids or heavier liquids from lighter liquids is shown in FIG. 4. The mechanism 51 comprises a container 52 with end walls and an opening 53 at the bottom which is closed by a tubular baffle device 54 extending between the end walls. The baffle is maintained in position adjacent the opening 53 by the lower support wall 55, side wall 56 of the container and an upper support wall 57. The baffle bears against the sloping side wall 58 of the container contacting it at 59 and closing off the vertical flow path of the mixture, introduced from an inlet 60, to the outlet opening 53. Preferably, the side wall 58 slopes at an angle of approximately 45°. One wall 61 of the baffle may be adhesively attached to the side wall 56 of the container. A sloping wall 62, attached to the container side wall 56 and the upper support wall 57, directs the mixture into the gap 63 formed between the baffle and the sloping side wall 58 of the container. An outlet 64 is provided in the sloping container side wall 58 above the baffle. The baffle is partially filled to a uniform depth with a flowable nongaseous material 65 and can be inflated under a pressure sufficient to maintain its shape substantially within the area bounded by walls 55, 56, 57 and 58 while still retaining flexibility.

The mixture introduced through inlet 60 may be an immiscible mixture of heavy and light liquid or liquid-like material. The heavy liquid sinks down into the gap 63 and, when the weight of the liquid builds up to a point where it is sufficient to overcome the lateral pressure exerted by the flowable material in the baffle, the wall of the baffle is moved away from sloping wall 58 allowing the heavy liquid to pass through opening 53. The reduction in the head pressure as the heavy liquid passes past the baffle, and the reduction in force exerted on the baffle as the heavy material moves past, will allow the baffle to move back against the sloping wall to close the opening again. The lighter liquid flows through side wall outlet 64. The baffle device can also be used to separate heavy solids from a solid-liquid mixture.

In this embodiment, the mixture is separated using only the weight of the heavier material to move the baffle. If desired, however, a vibratory device 66 can be used to impart vertical vibratory motion to the container and thus impart force to the heavy liquid or the solid particles to urge them under the corner 67 of the baffle which contacts sloping wall 58. When the corner 67 is moved back, the pressure exerted by the flowable material within the baffle is reduced at this corner allowing the heavy material to more easily work its way down between the baffle and side wall 58 to the opening 53. Two baffles instead of one may be located at the bottom of the container in abutting relationship with the solid material passing between the two baffles.

The novel baffle of this invention provides a method for separating solid from liquid material. The method comprises moving solids in one direction from a solid-liquid mixture zone to an outlet through a portion of a baffle zone formed by the baffle device. A substantially uniform pressure, transverse to the direction of movement of the solids, is provided at all portions of the baffle zone which is effective to inhibit liquid from the solid-liquid mixture passing through the baffle zone to the outlet. This pressure is due to the weight of the flowable material in the baffle. The solids, in passing through a portion of the baffle zone, reduce the pressure at that portion exerted on the solids. The pressure is reduced due to the solids causing the flowable material in the baffle to move away from the solids.

More generally, the baffle provides a method for separating a mixture of at least two substances. A substantially uniform pressure is provided at a baffle zone with the pressure acting transverse to the direction one of the substances has to move through the baffle zone from a containment zone to an outlet. The pressure is sufficient to maintain the other substance in the containment zone. The one substance is moved toward the baffle zone to exert a force on at least a portion of the baffle zone which causes a reduction in the transverse pressure at the baffle zone acting on the one substance to permit it to pass through the zone. The force exerted by the one substance in the baffle zone could be gravitational force or force imparted to it by vibratory motion of the containment zone.

I claim:

1. A separating device, rigid means defining a flow path for a mixture of at least two substances, a separating baffle retained by said rigid means in a position blocking at least a portion of the flow path, one of said substances capable of exerting a greater force on the baffle than the other substance, the baffle permitting the passage of the substance capable of exerting the greater force and inhibiting the passage of the other substance, the baffle comprising a flexible walled trough-like member impermeable to fluid and partially filled to a uniform depth throughout its length with a nongaseous flowable material.

2. A separating device as claimed in claim 1 wherein the baffle member has a closed tubular shape.

3. A separating device as claimed in claim 1 wherein the baffle member is toroidal shaped.

4. A separating device as claimed in claim 2 including means for inflating the baffle member to an internal pressure sufficient to render the same self-supporting but lower than the pressure that would impart stiffness to the member.

5. A separating device as claimed in claim 3 including means for inflating the baffle member to an internal pressure sufficient to render the same self supporting but lower than the pressure that would impart stiffness to the member.

6. A separating device as claimed in claim 1 wherein the flowable material is water.

7. A separating device comprising a container, an opening in the bottom of the container, a baffle in the container normally closing the opening, an inlet for supplying a mixture of at least two substances, one substance capable of exerting a greater force on the baffle than the other substance to the container, the baffle permitting the passage of the substance capable of exerting the greater force through the opening and inhibiting the passage of the other substance, the baffle comprising a flexible walled trough-like member partially filled to a uniform depth throughout its length with a nongaseous flowable material and an outlet for the other substance.

8. A separating device as claimed in claim 7 wherein the baffle has a closed tubular shape, means for inflating the baffle to an internal pressure sufficient to render the same self-supporting but lower than the pressure that would impart stiffness to the baffle, the baffle normally closing the opening by bearing against a side wall of the container.

9. A separating device as claimed in claim 8 including means for imparting vertical vibratory motion to the container.

10. A separating device as claimed in claim 7 wherein the baffle normally closes the opening by bearing against the floor of the container and means are provided for imparting vibratory motion to the container.

11. A separating device as claimed in claim 10 wherein the floor of the container comprises a screen, the opening being formed in a side wall of the container adjacent the screen floor.

12. A separating device comprising a vibratory screen, a baffle positioned on the surface of the screen, said baffle permitting the passage of solid material while inhibiting the passage of fluid material, an inlet for supplying a solid-fluid mixture to the screen, means for causing the solid-fluid mixture to move toward the baffle to separate the solids from the fluid, the baffle comprising a flexible walled trough-like member partially filled to a uniform depth throughout its length with a nongaseous flowable material.

13. A separating device as claimed in claim 12 wherein the baffle member has a closed tubular shape.

14. A separating device as claimed in claim 12 wherein the baffle member is toroidal shaped.

15. A separating device as claimed in claim 13 including means for inflating the baffle member to an internal pressure sufficient to render the same self-supporting but lower than the pressure that would impart stiffness to the member.

16. A separating device as claimed in claim 14 including means for inflating the baffle member to an internal pressure sufficient to render the same self-supporting but lower than the pressure that would impart stiffness to the member.

17. The combination of a screen for separating solid material from fluid, means for feeding a carrier fluid with solid material dispersed therein onto said screen, means for imparting motion to said screen so that solid material is propelled across the upper surface of said screen to a discharge zone of the screen while fluid flows through the screen, and a baffle disposed between said zone and the location at which said fluid and solid material are fed onto the screen whereby solid material must pass between the baffle and the screen before reaching said zone, the baffle comprising a flexible walled trough-like member partially filled to a uniform depth throughout its length with a nongaseous flowable material.

18. The combination as claimed in claim 17 wherein the baffle member has a closed tubular shape.

19. The combination as claimed in claim 17 wherein the baffle member is toroidal shaped.

20. The combination as claimed in claim 19 including means for inflating the baffle member to an internal pressure sufficient to render the same self-supporting but lower than the pressure that would impart stiffness to the member.

21. The combination as claimed in claim 19 wherein a peripheral retaining wall is provided which is co-axial and coextensive with said baffle member, an outer peripheral zone of said baffle member contacting said wall.

22. The combination as claimed in claim 19 wherein circumferentially spaced retaining elements extend from anchorage locations on said baffle member to a member located on the axis of said toroid, said baffle member itself being located by engagement with a central mounting element.

23. A method of separating a mixture of at least two substances confined by a container, the container having a baffle comprising a flexible walled trough-like member, the method comprising the steps of moving said substances in said container toward a portion of said baffle, the baffle providing a pressure throughout its length acting transversely to the direction of movement of the said substances and which pressure is effective to prevent passage of one of said substances from said container to said outlet, and reducing the pressure in said portion of the baffle above the other substance by the presence of the other substance as it passes said portion of the baffle thereby permitting said other substance to pass from the container to said outlet.

References Cited

UNITED STATES PATENTS

| | | | |
|---|---|---|---|
| 882,030 | 3/1908 | Traulsen et al. | 210—242 |
| 942,697 | 12/1909 | Allen | 210—113 |
| 1,591,923 | 7/1926 | Lebherz | 210—242 |
| 2,330,508 | 9/1943 | McColl | 210—242 |
| 2,540,517 | 2/1951 | Glasco | 210—385 X |
| 2,743,510 | 5/1956 | Mauney et al. | |
| 2,793,675 | 5/1957 | Simpson | 154—116 X |
| 2,968,928 | 1/1961 | Wicklander | 61—1 |
| 2,991,623 | 7/1961 | Morton et al. | 61—1 |

JOHN W. ADEE, Primary Examiner

U.S. Cl. X.R.

210—388